United States Patent [19]
Akay et al.

[11] Patent Number: 6,004,917
[45] Date of Patent: *Dec. 21, 1999

[54] PROCESS FOR THE PRODUCTION OF LIQUID COMPOSITIONS

[75] Inventors: Galip Akay, Sidmouth; Graeme Neil Irving; Adam Jan Kowalski, both of Bebington; David Machin, Birkenhead, all of United Kingdom

[73] Assignee: Lever Brothers Company, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,790

[22] Filed: Dec. 22, 1995

[30] Foreign Application Priority Data

Dec. 23, 1994 [EP] European Pat. Off. ............. 94309768

[51] Int. Cl.⁶ .................................................. C11D 11/00
[52] U.S. Cl. ..................... 510/276; 510/108; 510/328; 510/337; 510/405; 510/417; 510/515
[58] Field of Search ............................. 510/276, 337, 510/108, 405, 328, 417, 515

[56] References Cited

U.S. PATENT DOCUMENTS

| 5,021,195 | 6/1991 | Machin et al. ............................ 252/545 |
| 5,035,826 | 7/1991 | Durbut et al. ............................ 510/291 |
| 5,073,274 | 12/1991 | Caswell .................................... 252/8.6 |
| 5,296,158 | 3/1994 | MacGilp et al. ........................ 510/140 |
| 5,719,114 | 2/1998 | Zocchi et al. ............................ 510/383 |

FOREIGN PATENT DOCUMENTS

| 0048590 | 3/1982 | European Pat. Off. . |
| 194812 | 9/1986 | European Pat. Off. . |
| 203628 | 12/1986 | European Pat. Off. . |
| 0301208 | 2/1989 | European Pat. Off. . |
| 328176 | 8/1989 | European Pat. Off. . |
| 0580263 | 1/1994 | European Pat. Off. . |
| 0637629 | 2/1995 | European Pat. Off. . |
| 0649867 | 4/1995 | European Pat. Off. . |
| 56089832 | 7/1981 | Japan . |
| 772573 | 10/1980 | U.S.S.R. . |
| 1523678 | 9/1979 | United Kingdom . |
| 2119666 | 11/1983 | United Kingdom . |
| 2163088 | 5/1985 | United Kingdom . |
| 2179054 | 2/1987 | United Kingdom . |
| 2202785 | 10/1988 | United Kingdom . |
| 2216843 | 10/1989 | United Kingdom . |
| 2216844 | 10/1989 | United Kingdom . |
| 2280450 | 2/1995 | United Kingdom . |
| 85/ 01911 | 5/1985 | WIPO . |
| 94/14947 | 7/1994 | WIPO . |

*Primary Examiner*—Lorna M. Douyon
*Attorney, Agent, or Firm*—Neil Y. Gilbert, Esq.

[57] ABSTRACT

A process for producing a liquid composition containing at least one active component and a diluent by mixing the active with diluent and/or liquid active to produce a liquid crystal mixture and incorporating diluent into it such that the mixture remains substantially homogeneous to produce a composition in which the concentration of active components is lower than the concentration of active components in the liquid crystal mixture. Novel apparatus for use in the process is also described.

6 Claims, 1 Drawing Sheet

6,004,917

PROCESS FOR THE PRODUCTION OF LIQUID COMPOSITIONS

FIELD OF THE INVENTION

This invention relates to a process for the production of liquid compositions. In particular the invention relates to a process for the production of a structured liquid composition. The invention also relates to a liquid composition produced by such a process and to a novel apparatus for use in the process.

BACKGROUND OF THE INVENTION

Structured liquid compositions are found in many products including foods, for example margarines and low fat spreads, cosmetics and personal care products and detergents products, for example liquid detergent compositions and fabric conditioning compositions.

Generally, liquid compositions, which include solutions, gels and dispersions, are produced by simple mixing of the components of the composition. The active materials which may be liquid or solid are typically added to a liquid solvent, for example water in the case of aqueous compositions, and agitated and optionally heated to produce the liquid composition. Many liquid compositions are generally produced using a stirred batch mixer.

Simple mixing to produce a liquid composition conventionally involves subjecting the components to relatively low deformation rates in the mixing process whereby a mechanical shear effect is imparted to the composition. A typical process for the production of a liquid, for example a liquid detergent composition, may involve a shear deformation rate for example of the order of $10^4 \text{ sec}^{-1}$ being applied to the components of the composition.

Conventional liquid compositions generally contain a relatively low level of active material due to difficulties encountered in processing. Such difficulties arise as the viscosity of the mixture of the active and liquid solvent generally increases with a higher level of active which may lead to production of an inhomogeneous mass of highly viscous and shear thinning intermediate compositions. Such compositions are difficult to disperse in mixing processes and conventional apparatus as uncontrolled phase separation may occur. Moreover, the effective functioning of the mixing apparatus may be compromised or the required energy input may be prohibitively high at high viscosities.

In some processes, the active components for example oil and surfactant may be mixed initially prior to mixing with the liquid solvent and may be solid. In order to secure adequate mixing, the active mixture is typically heated to a temperature above the melting point of the active components if solid. Heat transfer in such mixtures is typically poor due to the generally high viscosity of the active mixture and thus presents further processing difficulties.

Thus, the conventional processes in which the active components are incorporated into the liquid solvent and the concentration of the actives remains constant or increases during the process exhibit several drawbacks. These problems include shear thinning effects, inefficient operation of the mixing apparatus and poor heat transfer. Consequently careful selection of active components and the levels to be incorporated is required especially if the active component comprises a solid. As a practical drawback, the flexibility in formulation may be somewhat limited due to the sensitivity of the process to variations in formulation.

EP 580,263 discloses a process for preparing a concentrated liquid aqueous solution of a salt of an alkyl ether carboxylic acid salt and optionally adding thereto an ethoxylated and optionally carboxymethylated product derived from a polyhydric alcohol The mixture may then be diluted with water. In the Examples, a homogeneous "paste" is produced which is then diluted with water to the desired concentration. On the basis of the components disclosed, it appears that the "paste" is a concentrated solution of surfactants some of which may act as a hydrotrope. It is noted that the water is incorporated by a simple mixing process and controlled addition of the water to the paste to maintain homogeneity and avoid uncontrolled phase separation does not appear to be necessary.

GB1523678 discloses a process in which oil is added to water to produce an oil in water concentrated emulsion and then diluted with water to the desired composition. The process steps are conducted over a long period (hours) and this may represent a serious disadvantage.

SUMMARY OF THE INVENTION

We have found that these problems may be alleviated by mixing at least one active component with a liquid component of the composition to produce a viscous mixture, for example a paste, homogenising the mixture and gradually incorporating a diluent into the mixture whilst maintaining the homogeneity thereof in order to produce a composition having the desired concentration of active components. The diluent is added to the homogeneous mixture of active components in a controlled manner whereby the concentration of active component in the mixture decreases during the addition to produce the liquid composition.

DETAILED DESCRIPTION OF THE INVENTION

Figure 1A:
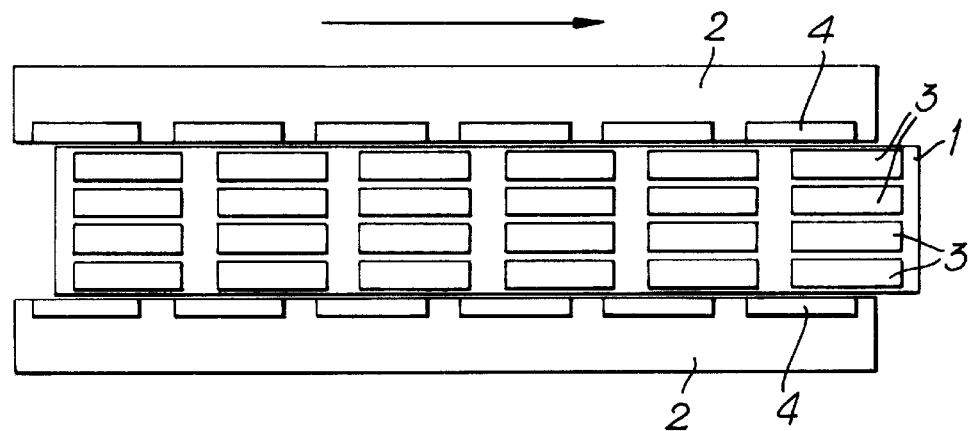
FIGS. 1a, 1b and 1c show a cross section of a stator and a plan view of the rotor journalled within the stator with the rotor in, respectively, an advanced, retracted and zero-offset position in relation to the stator.

Accordingly a first aspect of the invention provides a process for producing a liquid composition comprising at least one active component and a diluent which comprises mixing an active component of the liquid composition with a liquid active component and/or diluent of the liquid composition to produce a liquid crystal initial mixture and incorporating a diluent into the initial mixture wherein the diluent is incorporated such that the mixture remains substantially homogeneous during the said incorporation to produce a substantially homogeneous liquid composition having a concentration of active components less than the concentration of active components in the said initial mixture.

Preferably the initial mixture has a viscosity of at least 4000 mPas, and preferably at least 10000 mPas at a shear rate of $21s^{-1}$ By 'homogeneous' we mean a mixture which exists as a single phase, for example a liquid crystal phase and an isotropic liquid, a uniform dispersion of the diluent in the active mixture, or a uniform dispersion of the active mixture in the diluent. The homogeneous mixture may be planar lamellar or vesicular lamellar in structure. Maintaining homogeneity of the mixture does not imply that it must remain in one physical form during the process but that, if the physical form does change then each physical form should be homogeneous. It is therefore within the scope of the invention for the initial mixture to be present as a single phase and then become a multiphase mixture during the addition of the diluent, for example continued addition of the diluent may produce a dispersion from a single phase mixture. It is essential that uncontrolled phase separation does not occur.

Homogeneity can be considered as being maintained if either, the process run, when repeated, provides products from the runs which have relative refractive indeces which are within points of each other, or in a continuous process the variation in relative refractive index of the product produced at different points in the process is no more than 2.

Relative Refractive Index may be calculated by multiplying the difference between the Refractive Index of the final product and that of the diluent (for example water in aqueous products) by 1000. Refractive Index may be determined using a conventional refractometer.

By adding the diluent to the active mixture to decrease the concentration of active whilst maintaining homogeneity liquid compositions having high active levels may be produced and flexibility in formulation may be secured which in the conventional process would present processing difficulties due to the difficulty of mixing a viscous paste in a conventional batch mixer.

The process may be employed to produce an isotropic liquid composition for example a liquid detergent composition but is especially beneficial in producing a structured liquid composition.

We have found that problems associated with the conventional process for producing structured liquid compositions may be further alleviated by subjecting the homogeneous mixture to a high rate of deformation, particularly extensional deformation.

Accordingly, a second aspect of the invention provides a process for the production of a structured liquid composition comprising an active component and a diluent which comprises:
i) mixing an active component of the composition with a liquid active component and/or part of the diluent to produce a substantially homogeneous liquid crystal mixture;
ii) incorporating diluent to saturate the liquid crystal mixture with respect to the diluent whereby a substantially homogeneous continuous phase comprising the active component and diluent, and optionally a dispersed phase comprising the diluent, is produced;
iii) producing a substantially homogeneous dispersion of the saturated liquid crystal mixture in a continuous diluent phase;
iv) optionally diluting the dispersion with further diluent to provide the desired concentration of active component.

The liquid crystal mixture may be in any known form such as a hexagonal, reversed hexagonal, cubic or lamellar phase mixture.

It is an essential feature of the invention to maintain substantial homogeneity in the mixture whilst incorporating further diluent and, if present, during the phase inversion step for example between steps ii) and iii) according to the second aspect of the invention. The diluent is suitably incorporated in a plurality of doses in step i) and preferably step ii) with rapid mixing and in such a quantity that substantial homogeneity is maintained.

Preferably the phase inversion step, if present, is conducted under a high deformation regime. High deformation of the process mixture permits stress to be transmitted to the dispersed phase such that homogeneity may be maintained. The diluent phase is generally less viscous than the active phase and following inversion the mixture is suitably subjected to extensional deformation whereby stress is transmitted to the dispersed phase. Shear deformation is also generally desirable in the phase inversion step.

By "active component" we mean a component of the liquid composition, other than the diluent, which affects the rheology of the process mixture during the incorporation of the diluent. For example, in the case of a liquid detergent composition, an anionic surfactant and/or a nonionic surfactant may constitute the active component(s) and water may constitute the diluent. Other active components may be present as desired. The 'active component(s)' may be present in the process in liquid form but may include solids which are soluble in any of the other components in the composition as such material will influence the rheology of the process mixture.

The diluent constitutes that liquid or liquids in which the active components are dispersed and/or dissolved in the liquid composition, for example, water constitutes the diluent in an aqueous rinses conditioner or an aqueous liquid detergent composition. If desired a plurality of diluents maybe employed and the diluent added at each point in the process may be the same or different to that added elsewhere.

This process allows a significant broadening of the formulation flexibility in the processing of liquid compositions as a wider variety of components may be incorporated and compositions having a higher concentration of active materials may be produced than was hitherto the case. Improved process flexibility is secured, for example the optimal order of addition of the active components may be determined and tolerated in the process and the diluent may be introduced at a variety of points in the process. Under extreme processing conditions for example, during deformation during phase inversion a fine structure may be produced in the composition and may be closely controlled. This has the benefit of facilitating the production of a composition having consistent physical characteristics and therefore less product variation during a production run.

The active component may be a liquid or a solid. Further, a plurality of active components may be employed as desired and may be mixed to produce a premix of active components. The premix may then be mixed with the diluent or a liquid active component in step i) to produce the liquid crystal mixture. The active component may be mixed with the diluent and/or liquid active component sequentially and/or simultaneously and, if desired, may be introduced into the process as a solution or dispersion in the diluent and/or a liquid active component in step i) and/or ii).

Incorporation of diluent in step i) and/or ii) may be conducted at elevated temperature, especially if the active component is solid at ambient temperature in which case the temperature is suitably above the melting point of the solid active component.

Optionally in step i), the active component and the diluent and/or liquid active component may be subjected to a deformation regime which may contain a shear flow and/or an extension flow element to aid the mixing, homogenising and formation of the liquid crystal mixture.

The liquid crystal mixture is suitably a paste and generally comprises at least 50%, preferably at least 65% and especially in excess of 70% active component. Suitably the diluent and/or liquid active component constitutes the balance of the mixture. The liquid crystal mixture may be a dispersion, emulsion or suspension. The liquid crystal mixture may be lamellar depending on the active component(s), diluent and their relative amounts.

It is especially preferred that a part of the diluent be incorporated into the liquid crystal mixture subsequently to its formation and more preferably that a plurality of subsequent charges of the diluent be introduced in step-wise fashion as this facilitates the maintainence of a substantially homogeneous liquid crystal mixture.

By this process step, the ratio of active component to diluent changes and, more specifically decreases during the formation of the liquid crystal mixture.

Suitably, where the liquid crystal mixture is lamellar, the temperature of the lamellar mixture is controlled to ensure that the mixture is in or passes through the L$\alpha$ phase during the addition of the diluent to the initial mixture. Suitably, the mixture with further addition of diluent passes directly or indirectly through intermediate phase(s) into the $L_1$+L $\alpha$ phase. Depending on the type of composition, the mixture may pass into the $L_1$+L$\beta$ phase on cooling in which the molecule chains are relatively immobile. It is generally preferable to dilute the mixture to the final desired concentration at a temperature above the $L_1$+L$\alpha$/$L_1$+L$\beta$ phase transition temperature as this suitably provides a product having a lower viscosity.

A further aspect of the invention provides a homogeneous lamellar mixture having an active component layer and a diluent layer obtainable by, and preferably obtained by, a process comprising mixing an active component with a liquid active component and/or diluent of the composition to produce a initial mixture which is preferably substantially homogeneous, and incorporating diluent into the said initial mixture wherein the diluent is incorporated such that the mixture remains substantially homogeneous during the said incorporation to produce a substantially homogeneous lamellar mixture having a concentration of active component less than the concentration of active components in the said active mixture.

The surprising storage stability of the homogeneous mixture has the practical benefit that the dilution step in the first part of the process may be only partly completed or, the dilution step and, if present, the phase inversion step may be decoupled. Thus production of the homogeneous mixture may continue if the phase inversion step is inoperable and, if desired the production may be carried out on different sites.

As high viscosities are encountered in the steps i) and ii) conventional mixing apparatus is generally not suitable for use. A conventional extruder suitably equipped with a conveying screw preferably twin inter meshing conveying screws, has been found to provide an excellent apparatus in which to mix the active component with the diluent and/or liquid active component as the components may be forced through it thus applying deformation and providing intimate and rapid mixing to produce the homogeneous, liquid crystal preferably lamellar, mixture. Furthermore the extruder may be used to force the components through the subsequent steps in the process if the apparatus employed in such steps does not provide a conveying function.

Desirably the extruder has a plurality of inlet ports along its length through which active component and especially diluent may be introduced in one or more successive charges. The process may be batch but is preferably continuous, the extruder being particularly suitable for use in a continuous process.

The further diluent is incorporated into the liquid crystal mixture to saturate it and may cause the mixture to undergo a phase inversion to a dispersion of a saturated liquid crystal-in-diluent system and/or a diluent-in-saturated liquid crystal-in-diluent system. Suitably the further diluent is mixed with the liquid crystal mixture prior to and optionally during the phase inversion step if present.

Phase inversion-is preferably induced by subjecting the saturated liquid crystal mixture to a high deformation rate.

The saturated liquid crystal mixture suitably comprises at least 20%, and preferably at least 25% by weight of active component. Suitably the diluent constitutes the balance.

Where the continuous diluent phase of the substantially homogeneous dispersion is less viscous than the dispersed saturated liquid crystal phase following phase inversion, as will generally be the case, extensional deformation effects the transmission of stress to the dispersed phase such that continued mixing results to maintain a substantially homogeneous dispersion. Desirably, shear deformation is imparted to the dispersion in addition to extensional deformation.

The deformation rate and preferably extensional deformation rate employed will be determined by the type of composition being processed, for example a rinse conditioner composition will generally be subjected to a deformation rate of at least $3 \times 10^3$ sec$^{-1}$. Heavy duty liquids are optimally processed using a deformation rate of preferably $3 \times 10^3$ to $10^5$ sec$^{-1}$. Preferably the deformation rate is more than $10^4$ sec$^{-1}$, more preferably $3 \times 10^4$ sec$^{-1}$, for example $10^5$ sec$^{-1}$.

In especially preferred processes, the process stream is subjected to shear at a level of more than $3 \times 10^3$, more preferably at least $10^4$ s$^{-1}$, extensional flow at a level of $3 \times 10^3$, more preferably at least $10^4$ s$^{-1}$ or even more preferably to both extension and shear at these levels or above.

If a combination of extension and shear deformtion are employed we have found that the overall deformation rate required in a particular case is lower than that required if either extensional or shear deformation alone were to be employed.

The high deformation regime intensifies the structuring process and permits highly viscous mixtures to be processed such that high levels of active components may be incorporated into the composition.

Control of temperature and deformation rate provides a means by which crystallisation of an active component for example a liquid surfactant may be secured.

A further aspect of the invention provides a substantially homogeneous, structured dispersion having a dispersed phase containing an active component and a diluent and a continuous phase containing a diluent obtainable by, and preferably obtained by, providing a substantially homogeneous liquid crystal mixture having an active component layer and a diluent layer, incorporating further diluent to saturate the mixture and to produce a substantially homogeneous dispersion of the diluent in a continuous saturated liquid crystal phase, subjecting the saturated mixture to deformation whereby the phases are inverted and stress is imparted to the dispersed active phase to produce a structured substantially homogeneous dispersion.

The dispersion suitably has an average droplet size of less than 10 $\mu$m, preferably less than 5$\mu$m and desirably 0.01 to 4 $\mu$m, for example 1 $\mu$m. We have found that by operating according to the process of the present invention that for a given composition and viscosity that a significantly reduced droplet size may be obtained. The provides dispersions having excellent storage stability.

The droplet size may suitably be measured using a light scattering instrument for example a Malvern Mastersizer.

The deformation step has the further advantage that bacteria present in the process mixture or processing apparatus may be destroyed due to cell rupture under a high deformation regime. Under static conditions a pressure of the order of 5000 bar is generally required to kill bacteria however in the present process a combination of high pressure and deformation together is more effective than static pressure in destroying bacteria and the process conditions of the present invention therefore provide a micro biologically "clean" composition. The deformation step may be carried out in any apparatus in which high extensional deformation rates may be obtained. A preferred apparatus in this regard is described below.

The structured liquid composition obtained from the deformation step is suitably subjected to further processing according to the particular application. As the composition will generally contain a high level of active component, dilution of the composition with further diluent to adjust the concentration of the active component is generally desirable. Such further dilution is desirably controlled as regards the rate of addition of the diluent and rate of mixing in order to maintain the substantially homogeneous characteristic of the dispersion.

The present invention is especially applicable to the production of a structured cleaning liquid for fabrics or hard surfaces, and personal washing products, suitably wherein at least one surfactant is present as an active component, and-water is present as the diluent. Fabric conditioning compositions containing an organic cationic quaternary ammonium compound as an active component and water as the diluent may also be produced. The liquid composition may contain a plurality of dispersed liquid crystalline phases and other dispersed liquid and/or solid phases as desired.

The process according to the invention is particularly suited to the production of liquid compositions containing as an active component, one or more anionic, nonionic, cationic and/or zwitterionic surfactants known in the detergents art and wherein the diluent is water and/or a surfactant which is immiscible with the surfactant active component.

Examples of suitable surfactants which may be employed include, alkylbenzene sulphonates, alkyl sulphates, alkyl ether sulphates, olefin sulphonates, xylene sulphonates, soap and alcohol alkoxylates, any of which preferably have a $C_9$ to $C_{22}$ alkyl chain. Alcohol alkoxylates and alkylbenzene sulphonates more preferably have an alkyl chain length of 9 to 15 carbon atoms.

Suitable alkoxylated, preferably ethoxylated, materials may have an average degree of alkoxylation of 1 to 40 depending on the application. For a fabric washing composition the degree of alkoxylation is preferably 1 to 15, preferably 1 to 10 and for a fabric rinse conditioner preferably 10 to 25.

Fabric conditioners suitably contain a cationic surfactant, preferably a quaternary ammonium compound at a level of 1 to 30%, preferably from 1 to 10% for a dilute conditioner product and preferably from 10 to 30%, especially 10 to 25% for a concentrated product. Examples of suitable cationic surfactants are disclosed in EP239910, the disclosure of which is incorporated herein by reference.

Fabric washing compositions, in addition to the usual anionic and optionally nonionic surfactant, typically include a builder material. Suitable builders include phosphates such as tripolyphosphates and zeolites especially of the A and P type.

Other components may be included in fabric washing compositions as desired and include polymers, such as homo or copolymers of acrylic acid, maleic acid or anhydride; electrolytes such as inorganic salts for example citric acid, citrate and chloride salts of alkali metals, and glycerol and borax; other conventional components such as carbonate and silicate alkali metal salts and minor ingredients. If desired, enzymes and/or bleach, for example alkali metal percarbonate may be included in the composition.

Components in the liquid composition may be present at conventional levels or even higher levels as the present process allows such materials to be processed at levels where ordinarily, the viscosity would be prohibitively high for a conventional liquid production process to be used.

The deformation step is preferably carried out in a novel mixer comprising confronting surfaces, each having a series of cavities formed therein in which the surfaces move relatively to each other and in which a liquid material is passed between the surfaces and flows along a path successively through the cavities in each surface and is subjected to extensional deformation and/or shear deformation and preferably both extensional and shear deformation.

A mixer is known in which the cavities are arranged on the relevant surfaces such that shear is applied to the liquid as it flows between the surfaces. The cavities are arranged on the respective surfaces such that there is a relatively small change in the effective cross-sectional flow area as the material passes through the mixer. In such mixers, primarily distributive mixing is obtained. Generally the cross-sectional area for flow varies by a factor of less than 3 through the apparatus. Shear is applied by the relative movement of the surfaces in a generally perpendicular direction to the flow of the material there between. This apparatus is described in EP 194 812.

It has been found that, in addition to shear, significant extensional flow and efficient distributive and dispersive mixing may be secured by providing an apparatus having confronting surfaces and cavities therein in which the cavities are arranged such that the cross-sectional area for flow of the liquid successively increases and decreases by a factor of at least 5 through the apparatus. The invention further provides a dynamic mixing apparatus for inducing extensional flow in a liquid composition which comprises closely spaced relatively moveable confronting surfaces each having a series of cavities therein in which the cavities on each surface and are arranged such that, in use, the cross-sectional area for flow of the liquid successively increases and decreases by a factor of at least 5 and preferably at least 10 through the apparatus.

Preferably, each confronting surface has at least one ring of cavities arranged therein such that the cavities in each ring are positioned equidistant or near equidistant from the common axis of rotation and lie on or may be intercepted by a plane normal to the common axis of rotation. The ring(s) of cavities on each surface are suitably arranged relative to each other such that the cross-sectional area for flow available for material during passage through the apparatus successively decreases and increases by a factor of at least 5, and preferably at least 10. Optionally, the cavities in the confronting surfaces are offset relative to each other and so may overlap.

Suitably the confronting surfaces each comprise at least 2 and preferably at least 3 rings of cavities. Suitably, the cross-sectional area for flow increases or decreases by a factor of at least 5 between adjacent pairs of rings of cavities on each confronting surface.

Preferably, the confronting surfaces have a common axis of rotation and are generally complementary. One or both surfaces may be moveable as desired, the only requirement being to ensure that there is relative movement between the surfaces. The confronting surfaces may be of any suitable configuration but conical, planar, in which case the axis of rotation is perpendicular to the plane, and especially cylindrical are preferred.

If desired, 2 or more pairs of confronting surfaces may be employed for a single process stream pathway. For example, in a cylindrical arrangement, concentric pairs of confronting surfaces may be provided thus defining concentric pathways. The pathways suitably communicate in order to provide a continuous process stream pathway.

Suitably the temperature of the surfaces is controllable, thus it is preferable that the apparatus be equipped with thermal control means, for example cooling/heating jackets, for this purpose.

Apparatus having a cylindrical geometry may comprise a stator within which is journalled a rotor; the opposing faces of the stator and rotor carry the cavities through which the material passes during its passage through the device. The cavities in the stator and rotor are suitably arranged such that they are generally aligned or slightly offset in an axial direction whereby the material passes from a cavity in one through a constricted pathway defined by the confronting surfaces into a cavity in the other, during which passage the cross-sectional area for flow decreases and increases by a factor of at least 5, and more preferably at least 10.

The apparatus provides a mixer in which the modes (extension and shear), degrees, rates and times of deformation are controllable, quantifiable and, hence, optimisable with respect to the process material. This provides for excellent process control, flexibility and manipulation.

The process material is suitably mixed by shear deformation during each transfer across the annulus formed between the rotor and stator. A controlled extensional deformation is introduced via the relative axial offset positions of cavities on the rotor and stator, and is a maximium when the axial offset is reduced to its limit of zero. The process material is also preferably subjected to shear deformation as it is extended.

The invention also provides for the use of the novel dynamic mixing apparatus as herein described for the production of a liquid, gel or other fluid composition.

Figure 1B:
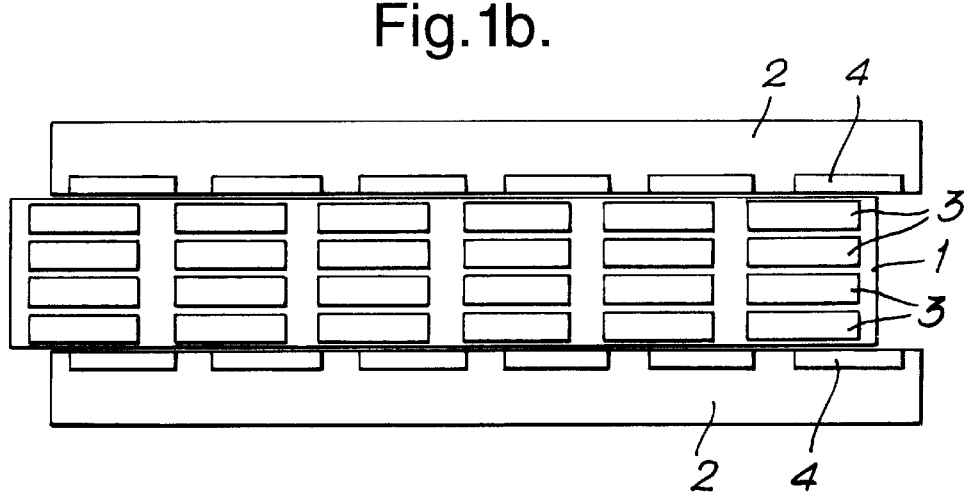
Figure 1C:
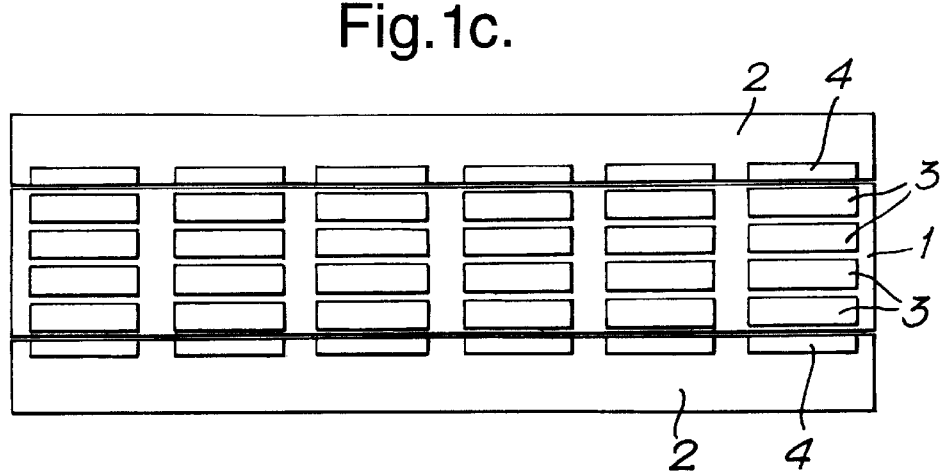

Apparatus of the invention is described further hereinafter, by way of example only, with reference to the accompanying drawings in which FIGS. 1a, 1b and 1c show a cross section of a stator and a plan view of the rotor journalled within the stator with the rotor in, respectively, an advanced, retracted and zero-offset position in relation to the stator.

In particular, the illustrated embodiment of the apparatus consists of a cylindrical rotor (1) which rotates within a cylindrical stator (2) during normal operation, the rotor (1) and stator (2) each having six circumferential rows of equal sized cavities spaced along their axial dimension. Each circumferential row on the rotor has eight cavities (3) and each row on the stator has eight cavities (4). Typically, the cavities are elliptical in shape and have an axial dimension which is about twice the cavity width maximum width which is itself about twice the cavity depth.

The rotor (1) may be positioned in either 'advanced' or 'retracted' positions as shown in FIGS. 1a and 1b, respectively. The words 'advanced' and 'retracted' describe the relative axial positions of circumferential rows of cavities on the rotor (1) (3) to those on the stator (2) (4) when compared to those for the zero axial off-set position shown in FIG. 1c having regard to the direction of flow of the process stream. In the advanced position the extensional flow occurs primarily during passage from the rotor (1) to the stator (2), whereas in the retracted position the extensional flow occurs primarily during passage from the stator (2) to the rotor (1). Shear is imparted to the process stream by the relative movement of the rotor (1) and the stator (2).

The invention is illustrated by the following non-limiting Examples. The following Table lists various components employed in the Examples.

| Chemical | Commercial name | Abreviation/ Name used | Manufacturer |
|---|---|---|---|
| Distearyidimethyl ammonium chloride | Varisoft TA100 | Varisoft TA100 | Witco GmbH |
| Sulphonic acid | Petrelab 550 | LAS | Petresa |
|  | Vista SA 5197 | LAS (Vista) | Vista Chemicals Company |
| Na alkylbenzene sulphonate | UFARYL DL 80W | Na LAS | Unger Fabrikker A.S. |
| Alcoholethoxylate $C_{12-15}$ 9EO | Neodol 25-9 | Neodol 25-9 | Shell |
| Alcoholethoxylate $C_{13-15}$ 7EO | Synperonic A7 | Synperonic A7 | ICI |
| Alcoholethoxylate $C_{13-15}$ 3E0 | Synperonic A3 | Synperonic A3 | ICI |
| Coconut acid | Prifac 7904 | Prifac 7904 | Unichema International |
| Oleic acid | Priolene 6907 | Priolene 6907 | Unichema International |
| Citric acid (anhydrous) |  | Citric acid | Pfizer |
| Tri sodium citrate |  | Sodium citrate | John & E Sturge Ltd |
| NaOH (47%) |  | NaOH | Ellis & Everard |
| KOH (49%) |  | KOH | Ellis & Everard |
| Glycerol |  | Glycerol | Unichema |
| Borax decahydrate |  | Borax | Borax Francais |
| Acrylic copolymer (33%) | Narlex DC1 | Narlex DC1 | National Starch |
| Derivative of a distyryl biphenyl | Tinopal CBS-X | Tinopal CBS-X | Ciba-Geigy |
| Silicone antifoam | Q2-3300 | Antifoam | Dow Corning Ltd |
| Na diethylene triamine penta (methylenephosphoric) | Dequest 2066 | Dequest 2066 | Monsanto |
| Zeolite | Vegabond Wessalith P | Vegabond Wessalith P | NV Soprolit SA Degussa |
| Sodium Silicate (40%) |  | Sodium silicate | Crossfields Chemicals |
| Sodium Xylene Sulphonate | Manrosol SXS40 | SXS | Manro Products Lyd |
| Sodium carbonate |  | Sodium carbonat | Brunner Mond |
| Calcium Chloride |  | Calcium Chloride | BDH |
| Aq sol of sodium salt of polyacrylic acid | Sokolan PA50 |  | BASF |

EXAMPLE 1

A series of fabric conditioning compositions were produced by a process according to the invention by feeding into a Werner Pfleiderer co-rotating twin screw extruder, a fabric conditioning compound (VARISOFT), as the active component, at a feed rate of 25 kg/hr and water, as the diluent, through an inlet in the barrel wall at a feed rate of 6 kg/hr and a temperature of 90° C. The components were mixed to produce a substantially homogeneous liquid crystal mixture containing 80wt% active component and 20wt% diluent.

Further water was then incorporated slowly into the mixture to produce a substantially homogeneous saturated or near saturated liquid crystal mixture having a temperature of 50 to 60° C. and containing 30wt% active and 70wt% water.

This mixture was then fed into a dynamic mixer according to the invention with sufficient ambient water to produce a mixture having an active composition of between 5 and 12 wt %. In passing through the mixer, a homogeneous dispersion of water in active was produced by the inversion of the liquid crystal phase and the saturated diluent.

The mixer had an internal diameter of 50 mm, a rotor length of 270 mm and was operated at a rate of rotation of 1400rev/min. The cavities extended along the rotor and the stator and in passing between cavities, the mixture was constricted by passage through a cross sectional flow area of less than 0.2 times the cross sectional flow area through the cavities.

The viscosity of the resulting compositions (in mpas) was measured at 110 sec$^{-1}$ and 25° C. The results are illustrated in Table 1.

Comparative Examples A and B

Compositions containing the same components as those produced in Example 1, ie between 5 and 11% VARISOFT fabric conditioning active component in water, were produced by conventional processes for the production of liquid compositions.

In Example A, the water was placed in a stirred vessel and active was added under stirring to the desired concentration. The mixing was carried out at elevated temperature in order to melt the active.

In Example B, compositions produced in Example A were subjected to a conventional post shear process to improve the viscosity characteristics of the final composition.

On visual inspection, compositions A and B were clearly more inhomogeneous as compared with example one especially at a high active level.

TABLE 1

| Active (%) | Example 1 (viscosity) |
| --- | --- |
| 5 | 40 |
| 8 | 65 |
| 11 | 155 |

The results illustrate that the process of the present invention may be employed as an alternative process route to conventional routes. An advantage of the process of Example 1 is that in heating the active in order to mix it with the water, only a proportion of the water need be heated whereas in Examples A and B, all of the water had to be heated.

EXAMPLE 2

An isotropic fabric washing liquid was produced by the following process. A paste (initial mixture) was formed in a 25 L batch mixer of the Z blade type. The ingredients were added in the order shown in Table 2.1 with the paste containing no added water. The paste was in a continuous liquid crystal phase and had a viscosity in excess of 20,000 mPas at 40° C. & 20/s. The paste was then injected into a continuous high shear mixing device (a cavity transfer mixer as described in EP194812 and then passed into a shear/extension zone as described in Example 1 and herein with reference to the accompanying figures). Water (diluent) at 80° C. was then mixed with the paste at 4 separate points as detailed in Table 2.1 and incorporated rapidly to maintain homogeneity to form the final product which was isotropic The first two dilution streams were added prior to the extension zone, the third was added midway along the extension zone and the final stream was added at the end of the extension zone.

TABLE 2.1

| | Stage 1 Paste (%) | Stages 2–5. Dilution streams (%) | Prior to extension zone |
| --- | --- | --- | --- |
| LAS acid (Vista) | 12.3 | | |
| NaOH (49%) | 3.5 | | |
| Neodol 25-9 | 4.5 | | |
| Sodium Silicate | 2.5 | | |
| SXS | 1.0 | | |
| Total paste | 23.8 | | Yes |
| Water Dilution 1 | | 17.8 | Yes |
| Water Dilution 2 | | 17.8 | Yes |
| Water Dilution 3 | | 17.8 | mid point |
| Water Dilution 4 | | 22.7 | No |
| Total Diluent | | 76.1 | |

During the continuous run, the flow and deformation conditions were varied as detailed in Table 2.2. If homogeneity is not maintained residual amounts of undispersed paste are present in the product and appear as undesirable small flecks. These products are thus prepared by a comparative process not according to the invention.

TABLE 2.2

| Product flow rate | Shear rate (×10$^3$/s) | Extension Rate (×10$^3$/s) | Product |
| --- | --- | --- | --- |
| 360 kg/hr | 9 | 0 | flecks |
| | 14.1 | 0 | smooth |
| | 4.1 | 7.1 | smooth |
| 510 kg/hr | 9 | 0 | flecks |
| | 19 | 0 | flecks |
| | 24 | 0 | smooth |
| | 9 | 10.1 | smooth |

Product viscosity was in all cases about 200 mPas. The results show that shear alone is sufficient to disperse the high active paste if homogeneity is maintained but that application of shear in combination with extensional flow using for example the apparatus described in FIG. 1 allows homogeneity to be maintained at a lower value of the shear component of the flow. It is observed that an increased flow rate requires higher levels of minimum shear both with and without extension to maintain homogeneity and so disperse the paste. Increasing the extension rate at given operating conditions, for example by increasing the variation in cross-sectional flow area in the extension zone, then the minimum shear rate required can be reduced. Example 3

A fabric rinse conditioner composition was produced by the following process. VARISOFT powder was steadily fed (25 kg/hr) into a W&P extruder with water (6.25 kg/hr) (diluent) to form an 80% active paste (initial mixture)having a viscosity of about 400 mPas at 20/s. The mixture was heated to above 95° C. in order to melt the active and below 130° C. above which the water will tend to boil off. The screw elements and screw speed were selected to thoroughly mix the active and water and also to ensure that the high temperature (>100° C.) zones operate at sufficient pressure to prevent water turning to steam. The extruder fed the paste directly into a mixer as used in Example 2 where it was diluted further with demineralised water (50–70° C.). Diluent was added after the extensional flow zone at ambient temperature. The flow rates employed are detailed in Table 3.1 and the deformation rates are shown in Table 3.2. During the continuous process the level of diluent introduced into the mixer was varied to produce an active concentration of 15 to 40% (see Table 3.2) and the level of diluent subsequently incorporated adjusted to give a final concentration of 5%.

The particle/droplet size of the products was measured. A smaller particle size providing improved storage stability.

TABLE 3.1

|  | Flow rates (kg/hr) | Temperature (° C.) | Active concentration |
|---|---|---|---|
| Varisoft TA100 | 25 | 95–130 | 80% |
| Demin water | 6.25 | | |
| Demin water | 138->32 | 50–70 | 15->40% |
| Demin water | 330->435 | 20–40 | 5% |

Control samples were also made using a conventional standard process in a 3 L stirred tank followed by post shear (PS) in an Ultra-turrex high shear mixer (see respectively Control 1 and 2 in table 3.2). Products of greater than about 10–12% active could not be made.

TABLE 3.2

| Sample number | Active conc.after dilution | Shear Rate ($\times 10^3$/s) | Extension Rate ($\times 10^3$/s) | Mean particle size ($\mu$m) |
|---|---|---|---|---|
| Control 1 | NA | 0.1–0.5 | 0 | 9.2 |
| Control 2 | NA | 30 | 0 | 3.7 |
| 1 | 37 | 14.7 | 0 | 4.0 |
| 2 | 37 | 14.7 | 14.1 | 2.8 |
| 3 | 25 | 14.7 | 0 | 2.3 |
| 4 | 25 | 14.7 | 14.1 | 2.1 |
| 5 | 15 | 0 | 14.1 | 8.3 |
| 6 | 15 | 14.7 | 0 | 4.3 |
| 7 | 15 | 14.7 | 14.1 | 3.3 |

The smallest particle size (and hence the best stability) is achieved if the product has an active concentration after the first stage of 25%. This concentration is close to the phase transition (30%) between the continuous or lamella sheet phase (>30%) to a dispersed phase (<30%). The higher viscosity is believed to enhance the action of shear and extension. The smallest particle size is achieved where shear and extension were both applied. A comparison of Control 2 and Samples 2,3,4,7 shows that a smaller particle size is obtained at lower levels of shear and/or extension than for high shear alone. Products of higher concentration can be made compared to the conventional process.

EXAMPLE 4

Various concentrated fabric washing products were formed, all having the formulation listed in Table 4.1. All components except for the water are considered as "active components" within the meaning of the invention.

Pastes (initial mixture) were formed in a batch mixer of the Z blade type. The paste ingredients were selected from those detailed in Table 4.1 and added in the order shown in Table 4.2. Sufficient water was added to form pastes with an surfactant concentration relative to the water content as shown in Table 4.2. The remaining water and other ingredients were included as the diluent stream during the later mixing step. For simplicity the sodium hydroxide is included with surfactants since it was added in the Z blade mixer to neutralise the PRIOLENE. The paste formed was a lamellar liquid crystal phase. The pastes viscosities were measured and are listed in Table 4.2.

TABLE 4.1

|  | Ingredient | % as received |
|---|---|---|
| Water (W) | Demin water | 29.5 |
| Electrolyte (E) | Glycerol | 2 |
| | Borax | 1.5 |
| | Sodium citrate | 9.2 |
| Solid (S) | Vegabond XD | 18.7 |
| Polymer (P) | Narlex DC1 | 3.0 |
| Surfactant (A) | Synperonic A7 | 4.5 |
| | Synperonic A3 | 4.5 |
| | Na LAS | 20.7 |
| | Priolene | 4.5 |
| | NaOH (47%) | 1.3 |
| Minors | Tinopal CBS-X | 0.1 |
| | Antifoam | 0.3 |

TABLE 4.2

| Paste constituents & order of addition | Surfactant (A) concentration wrt water | Viscosity at 20/s (mPas) |
|---|---|---|
| WESPA | 70 | 11,000 |
| WESA | 70 | >100,000 |
| WSPA (1) | 70 | >20,000 |
| SPAW | 70 | >20,000 |
| WSPA (2) | 60 | >20,000 |
| WSA | 70 | 26,000 |

The diluent was formed in a conventional design of stirred tank at ambient temperature. The paste and diluent were injected into a short tube which led to the inlet port of mixer as employed in Example 2. The paste temperature was 35 to 55° C. Flow rates were employed to provide a product flow rate of about 20 kg/hr resulting in a long residence time in the mixer of the order of 3 min. The temperature of the ingredients was increased by heating the mixer to about 70–80° C. resulting in exit temperatures which were similar to the paste temperatures. Typical shear rates were in the range 3.5 to $10.5 \times 10^3$/S. The final products contained a dispersed liquid crystal phase.

A product having the composition in Table 4.1 was produced by a conventional batch method for comparative purposes.

The relative refractive index and viscosity of the final products were determined and the results are detailed in Table 4.3.

Results

TABLE 4.3

| Paste constituents & order of addition | RRI | Viscosity at 25° C. & 20/s |
|---|---|---|
| Batch control | 78 | 740 |
| WESPA | 103 | 1920 |
| WESA | 99 | 1500 |
| WSPA(1) | 98 | 750 |
| SPAW | 96 | 660 |
| WSPA(2) | 102 | 1010 |
| WSA | 100 | 1050 |

The results demonstrate that products of comparable viscosity to the conventional produced product can be made but with a much smaller particle size (indicated by a high increase in RRI) and hence better stability. For similar RRI lower viscosity product is obtained by excluding the electrolyte from the paste and adding it to the diluent stream. A comparison of WSPA(1) with SPAW illustrates that the order of addition in forming the paste does not have a major effect on the final product properties. Similar final product properties were achieved using a higher level of water in the paste (compare WSPA(1) with WSPA(2)). This is beneficial in practice as the process is not significantly affected by fluctuations in the water content of feedstock materials.

Comparative Tests

As a comparative test, two pastes (WESPA and WSPA as shown in table 4.2) were prepared in a small Z blade mixer (600 ml) and then diluted in the same mixer. Small aliquots of diluent (each 5wt%) were then added each over 1 minute but this resulted in clogging around the rotor and required the mixer to be periodically stopped to dislodge the paste.

This test demonstrated that the use of conventional batch mixers which are suitable for conventional mixing of pastes is not feasible. The compositions obtained had very high viscosities and were unacceptable.

A further set of comparative tests were conducted by forming pastes as listed in Table 4.2 and attempting to dilute them in a conventional batch stirred tank. It was found that the pastes tended to break into lumps and not disperse easily.

EXAMPLE 5

A concentrated fabric washing composition was formed by the following process. A paste was formed in a batch mixer of the Z blade type by mixing the ingredients shown in Table 5.1 in the listed order. The paste formed a lamellar liquid crystal phase and had a viscosity of 98,00 mPas measured at 40° C. & 20/s. The homogeneity of the paste was tested by by measuring the RRI of 10 samples of the paste taken randomly from the batch. The spread of RRI measurements for all the samples was provided a mean RRI of 161.5, with a standard deviation of 1.6.

The diluent stream was formed in a conventional design of stirred tank at about 80° C. (due to the heat of neutralisation). The diluent stream was added to the paste in one step in-a mixing device having a shear and extension zone as referred to in Example 2. The combined flow rate of the two streams was 220–230 kg/hr. The shear and extension rates were altered to produce a different product as shown in Table 5.2.

The final product contained a dispersed liquid crystal phase.

TABLE 5.1

| Ingredient | Paste | Diluent stream |
|---|---|---|
| Synperonic A7 | 4.5 | |
| Synperonic A3 | 4.5 | |
| LAS | 21.0 | |
| KOH (47%) | 5.7 | |
| Wessalith P | 18.7 | |
| Narlex DC1 | 3.0 | |
| Antifoam | 0.5 | |
| Tinopal CBS-X | 0.1 | |
| TOTAL | 58.1 | |
| Demin water | | 15.5 |
| Glycerol | | 2 |
| Borax | | 1.5 |
| KOH (49%) | | 14.4 |
| Citric acid | | 8.5 |
| TOTAL | | 41.9 |

TABLE 5.2

| Shear rate ×10³/s | Extenson rate (×10³/s) | Viscosity (mPas) | | RRI | |
|---|---|---|---|---|---|
| | | Initial | 4 wks at 20° C. | Initial | 4 wks at 20° C. |
| 4.4 | 0 | 700 | +250 | 84 | +3 |
| 44.0 | 0 | 790 | −190 | 108 | +1 |
| 4.4 | 16.0 | 1000 | +50 | 96 | +4 |
| 44.0 | 16.0 | 720 | −90 | 111 | +2 |

The results illustrate that at low shear, application of extension produces significantly smaller droplets in the product and at higher shear, optionally with extension, much smaller droplets may be obtained at a comparable viscosity to low shear and with a downward drift in viscosity. The products were acceptably stable over 4 weeks.

EXAMPLE 6

A concentrated fabric washing product having the composition listed in Table 6.1 was produced in the following way. The active component premix was a liquid and was made in a stirred tank. The diluent stream was also a liquid and was prepared in a stirred tank where its temperature was maintained at about 80° C. due to the neutralisation of the citric acid. The active stream and half of the diluent (electrolyte) stream were brought together in a mixing device as employed in Example 2 to form a paste/gel having a viscosity of 19,000 mPas measured at 40° C. & 20/s.

The remainder of the diluent stream was then injected into the process stream at a downstream point in the mixer to form the final product. The combined flow rate of the streams was of the order of 190–210 kg/hr. The shear rate applied to the product stream was varied as shown in Table 6.2 below.

For comparative purposes, a 40 L batch of the product was made in the conventional way by adding the ingredients to water in a stirred tank. Part of the comparative sample was subsequently subjected to shear on a Dispax high shear mixer. The results are presented as the first three samples in Table 6.2

TABLE 6.1

| | Actives premix | Electrolyte premix |
|---|---|---|
| LAS acid | 26.1 | |
| Synperonic A7 | 12.1 | |
| Demin water | 0.7 | |
| TOTAL | 38.9 | |
| Demin water | | 20.2 |
| Glycerol | | 5.0 |
| Borax (decahydrate) | | 3.5 |
| Citric acid (anhydrous) | | 6.5 |
| Sodium hydroxide | | 17.3 |
| Sodium carbonate | | 4.0 |
| Narlex DC1 | | 4.5 |
| TOTAL | | 61.0 |

TABLE 6.2

| | Shear (×10³/s) | Median particle size (μm) | Viscosity | Viscosity 4 wks 37° C. |
|---|---|---|---|---|
| Batch | 0.1–0.5 | 4.6 | 500 | Unstable |
| Batch + PS | 30 | 2.2 | 420 | +20 |
| Batch + PS | 82 | 1.3 | 740 | −130 |
| 1 | 4.4 | 4.1 | 370 | Unstable |
| 2 | 14.1 | 1.5 | 290 | −10 |
| 3 | 24.0 | 1.0 | 340 | +10 |
| 4 | 33.8 | 0.84 | 650 | −30 |

Application of a minimum level of shear is desirable in order to provide a product which remains stable after 4 weeks. The results also demonstrate that generally lower viscosity stable products were produced using the process according to the invention in which homogeneity was maintained rather than by conventional means. Furthermore, at comparable shear rates the process of the invention provides a smaller particle size which enhances product stability.

EXAMPLE 7

A conventionalk strength fabric washing liquid composition was produced according to the following process. The composition of the final product is shown in Table 7.1.

The paste was made batchwise using a Z-blade mixer and had a viscosity greater than 200,000 mPas measured at 40° C. & 20/s. The homogeneity of the paste was determined by making RRI measurements of 10 samples taken randomly from the batch. The mean RRI was 125.3 with a standard deviation of the sample of 0.9.

The remaining ingredients were mixed together in a conventional stirred tank to form the diluent stream. The paste was fed into the mixer referred to in Example 2 and the diluent stream was injected in two stages prior to the extension portion of the mixer. The combined flow rate of the streams was between 190–210 kg/hr and the shear rate was varied as detailed in Table 7.2.

TABLE 7.1

| Ingredients | Paste | Diluent |
|---|---|---|
| LAS acid (Vista) | 7.0 | |
| Synperonic A7 | 3.6 | |
| Synperonic A3 | 1.0 | |
| Sodium hydroxide | 2.0 | |
| Zeolite | 25.0 | |
| Antifoam | 0.2 | |
| Dequest 2066 | 2.4 | |
| Sodium xylene sulphonate | 2.0 | |
| TOTAL | 43.2 | |
| Demin water | | 43.6 |
| Citric acid (anhydrous) | | 2.3 |
| Sodium hydroxide | | 1.0 |
| Glycerol | | 5 |
| Borax (decahydrate) | | 4 |
| Calcium Chloride | | 0.15 |
| Sokolan PA50 | | 0.45 |
| TOTAL | | 56.5 |

For comparative purposes, a product having the same composition but produced in a conventional stirred tank optionally with post-shear was also produced. The viscosity and RRI data for these materials are also shown in Table 7.2

TABLE 7.2

| | Shear (×10³/s) | Viscosity (mPas) Initial | Viscosity (mPas) 2 wks, 20° C. | RRI Initial | RRI 2 wks, 20° C. |
|---|---|---|---|---|---|
| 1 | 4.4 | 717 | +59 | 56 | 0 |
| 2 | 44.0 | 650 | −2 | 53 | −1 |
| Control stirred tank | 0.1–0.5 | 1180 | | 51 | |
| Control stirred tank + PS | 32.0 | 1090 | | 51 | |

The process of the present invention allows a product having a lower viscosity and smaller droplet size to be prepared as compared to the conventional route which even with high post-shear gives a product which has an unacceptably high viscosity.

EXAMPLE 8

This Example illustrates the use of the apparatus according to the invention for the production of a stable fabric washing liquid composition.

A product having the formulation shown in Table 8.1 was prepared in the conventional manner using a stirred tank. The ingredients were added in the order shown in the Table. The product was then exposed to extensional flow optionally with shear by passing it through the mixing device referred to in Example 2 under the conditions specified in Table 8.2.

The products were initially stable and their stability was checked after 8 weeks.

TABLE 8.1

| Ingredients | % as received |
|---|---|
| Demin water | 32.1 |
| Citric acid | 5.5 |
| Glycerol | 5.0 |
| Borax | 3.5 |
| Tinopal CBS-X | 0.1 |
| NaOH (47%) | 14.3 |
| Narlex DC1 | 2.15 |
| Synperonic A7 | 10.8 |
| Priolene 6902 | 7.55 |
| Prifac 7904 | 5.0 |
| LAS | 13.0 |
| Perfume | 0.35 |
| Antifoam | 0.1 |
| Dequest | 0.55 |

TABLE 8.2

| Sample | Shear rate (/s) | Extension rate (s) | Stable at 8 weeks |
|---|---|---|---|
| Control | 0.1–0.5 | 0 | No |
| 2 | 0 | >22 000 | No |
| 2 | 2000 | 8 500 | No |
| 3 | 15000 | 8 500 | Yes |

The results show that a product having good stability may be obtained with a suitable combination of shear and extension.

We claim:

1. A process for the production of a structured cleaning or fabric conditioning liquid composition comprising a surfactant active component and a diluent selected from the group consisting of water, aqueous solutions and surfactants, with the proviso that any diluent surfactant is immiscible with the surfactant active component, the process comprising:

i) mixing an active component of the composition with a liquid active component, part of the diluent or both to produce a substantially homogeneous liquid crystal mixture, wherein the active component, the liquid active component or both contain a surfactant;

ii) incorporating the diluent to saturate the liquid crystal mixture with respect to the diluent whereby a substantially homogeneous continuous phase comprising the active component and diluent, and optionally a dispersed phase comprising the diluent, is produced;

iii) producing a substantially homogeneous dispersion of the saturated liquid crystal mixture in a continuous diluent phase; and iv) optionally diluting the dispersion with further diluent to provide the desired concentration of active component;

v) wherein the mixture is subjected to an extensional flow rate of more than about $3 \times 10^3$ sec$^{-1}$ and a shear rate of more than $3 \times 10^3$ sec$^{-1}$ in progressing from step (ii) to step (iii).

2. A process according to claim 1, in which at least 50 weight % of the liquid crystal mixture comprises at least one active component.

3. A process according to claim 1 in which the dispersion has an average droplet size of less than 10 $\mu$m.

4. A process according to claim 1 in which the liquid crystal mixture is lamellar and is in, or passes through the L$\alpha$ phase, directly or indirectly into the L$_1$+L$_\alpha$ phase during or subsequent to the addition of the diluent to the initial mixture.

5. A process according to claim 1 in which the active component comprises an anionic, nonionic, caronic or zwitterionic surfactant or mixtures thereof.

6. A process for producing an aqueous liquid composition according to claim 2 in which the diluent comprises water.

* * * * *